United States Patent [19]

Tanner

[11] 3,760,376

[45] Sept. 18, 1973

[54] SYSTEM FOR CONTROLLING OUTPUT LINES WITH LIMITED STORAGE CAPACITY

[75] Inventor: Howard C. Tanner, Austin, Tex.

[73] Assignee: International Business Machines Corporation, Armonk, N.Y.

[22] Filed: Dec. 28, 1970

[21] Appl. No.: 101,721

[52] U.S. Cl. .................... 340/172.5, 234/4, 197/84, 235/151.22

[51] Int. Cl. .......................... G06k 3/00, G11c 7/00

[58] Field of Search ................................. 340/172.5; 235/151.22; 234/4; 276/13; 197/84; 95/4.5

[56] References Cited

UNITED STATES PATENTS

| | | | |
|---|---|---|---|
| 3,293,613 | 12/1966 | Gabor | 340/172.5 |
| 3,299,408 | 1/1967 | Wang et al. | 340/172.5 |
| 3,307,154 | 2/1967 | Garth, Jr. et al. | 340/172.5 |
| 3,439,341 | 4/1969 | Dolby et al. | 340/172.5 |
| 2,848,049 | 8/1958 | Robbins et al. | 340/172.5 X |

OTHER PUBLICATIONS

I.B.M. Technical Disclosure Bulletin, Vol. 4, No. 12, May 1962, pages 67–70, "Composing Machine" by Lincoln et al.

*Primary Examiner*—Paul J. Henon
*Assistant Examiner*—Paul R. Woods
*Attorney*—Hanifin & Jancin and James H. Barksdale, Jr.

[57] ABSTRACT

A system for justifying an output line where the total number of required data codes for computing a justification solution exceeds the buffer storage provided for the output line. Given a storage capacity of n data codes, when *n*-1 data codes have been read, counted, and stored, and a sufficient number of codes have not been stored for computing a justification solution based on the sum of the escapement values, a signaling data code is generated and stored. Then output from the buffer is initiated and continues until a space code is read. Thereafter, additional data codes are read and stored in the buffer and the above operation is repeated until a sufficient number of data codes have been read to compute a justification solution for remainder of the output line.

4 Claims, 1 Drawing Figure

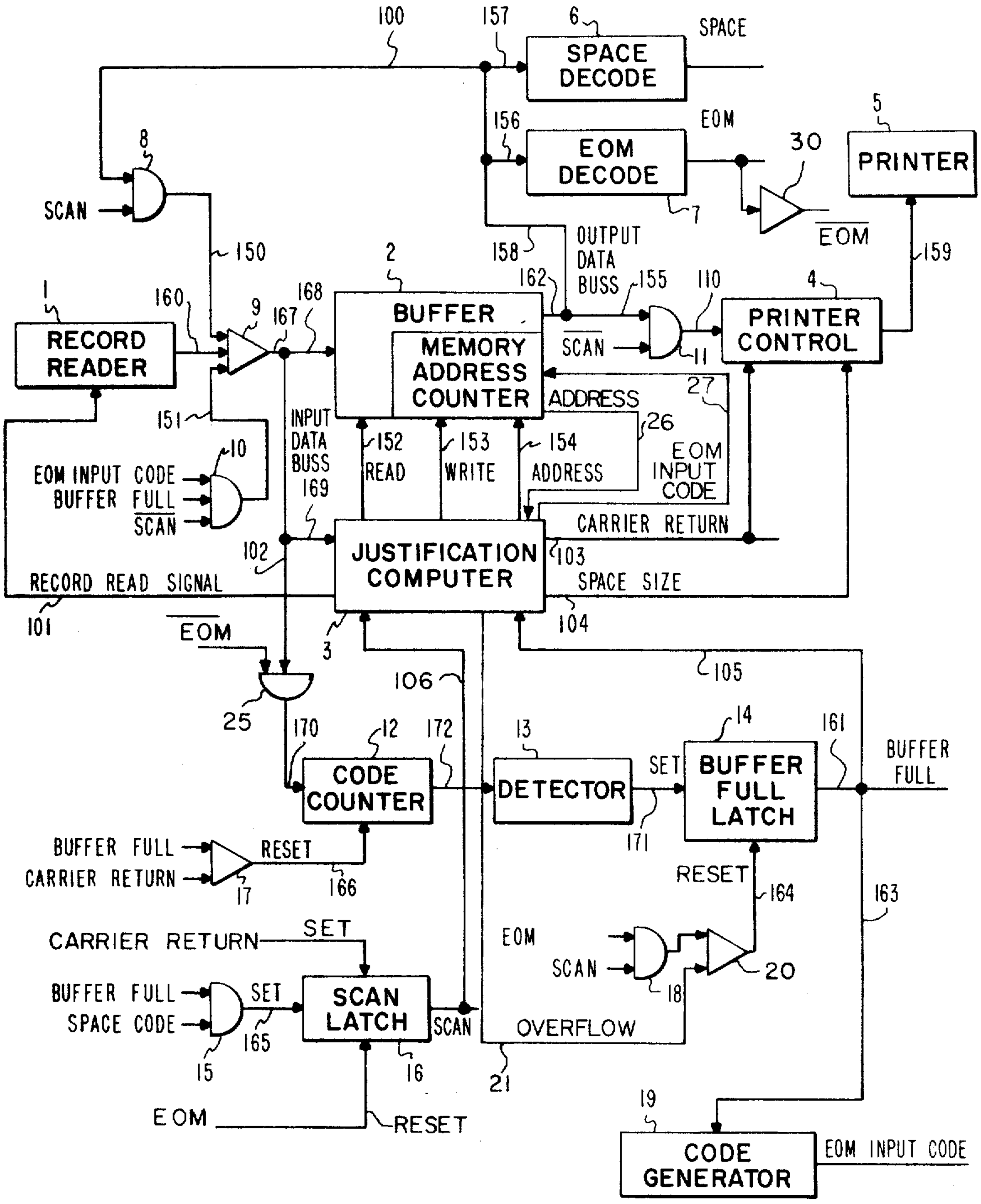
INVENTOR
HOWARD C TANNER
ATTORNEY

SYSTEM FOR CONTROLLING OUTPUT LINES WITH LIMITED STORAGE CAPACITY

BACKGROUND OF THE INVENTION

1. Field of the Invention

This invention relates to the justification of graphical material in general. More particularly, this invention relates to a system having an output buffer which effectively is made of infinite length by a control technique which allows alternate inputting into and from the output buffer simultaneously with justification calculations.

2. Description of the Prior Art

Heretofore, there was not a simple and efficient way of handling, for justification purposes, a number of data codes which exceeded the storage capacity allocated for an output line without altering the measure. In many cases, altering the measure was not an acceptable solution due to the appearance of the output copy. Other disadvantages were inherent, such as the necessity for continuous operator attendance. The ultimate solution for this problem in the past was to provide for larger and more expensive storage and memory units, or several smaller storage and memory units. The basic structure, as far as the combination of a record reader, buffer, memory address counter, printer control, and printer is concerned, is part of the Magnetic Tape Selectric* (*Registered Trademark, International Business Machines Corporation Composer (MT/SC). Interconnections in terms of inputs to the justification computer and buffer, and between the justification computer and buffer in terms of reading, writing, and addressing are also utilized in the MT/SC system and are well known. Reference is made to IMB Office Products Division Customer Engineering MT/SC and MT/SR Instruction Reference Parts Catalog, Form No. 241-5460, Complete Manual.

SUMMARY OF THE INVENTION

Briefly, a system is provided for justifying an output line where the total number of data codes required for the line exceeds the allocated buffer storage capacity. After a number of data codes less than the allocated buffer storage capacity have been read, counted, and stored, and this number is insufficient for computing an acceptable justification solution, a signaling data code is generated and stored. When this occurs, characters are output to a predetermined space, being the first, second, etc., space or a predetermined number of characters are output. Thereafter, additional data codes are read and stored and the above operation is repeated until a sufficient number are available for computing a justification solution for the remainder of the line.

The handling of output lines with the above described system will become more readily understood when the remainder of the specification is read and considered in connection with the accompanying drawing.

BRIEF DESCRIPTION OF THE DRAWING

The single drawing is a block diagram of the system of this invention.

DESCRIPTION OF THE PREFERRED EMBODIMENTS

In accordance with this invention, a system is provided for controlling output lines while operating in a justification mode with limited storage capacity.

Implementation of the entire system may take a number of forms, all well within the skill of those knowledgeable in the graphic and data processing arts. The record reader, justification computer, printer control, and printer used may be of the form of any conventional apparatus readily available, or may take the form described in U. S. Pat. No. 3,483,527. A detailed description of a justification computer is set out in U. S. Pat. No. 2,379,862 For purposes of this invention, the justification computer can be a simplified justification system which is used in conjunction with a small buffer, and which is not necessarily of the stored program type.

Throughout the specification, the line measure defined by the left and right margins is considered to be the parameter within which the line is to be controlled. The storage requirements for the best or tightest output line for justification purposes would ultimately be determined by the number of escapement units represented by characters and spaces for filling the measure. If the sum of the escapement units for the buffer stored characters and spaces is insufficient in terms of computing a justification solution, (less than the measure) and the storage capacity of the buffer has been taken up, then the additional characters necessary for computing a justification solution must be provided for.

Codes input to a justification computer and printer from a preprepared input medium include codes carried on such items as paper tapes, magnetic tapes, magnetic cards, punch cards, etc., and also may include codes for signals input by an operator making panel entries. The input medium or record carrying the raw data may be prepared as a sequence of codes recorded by special typewriters available for this purpose or the record may be prepared by any other suitable means. These input data codes which have been recorded are read by a record reader under the control of the justification computer.

In the drawing, a bar over an input signifies a false or down condition, whereas the absence of a bar signifies the up or true condition.

Referring to the drawing, there is shown a system comprised of a record reader 1 which reads data codes from an input medium, buffer 2 and included memory address counter, justification computer 3 which computes a justification solution for output lines, printer control 4, and a printer 5. In the normal mode of operation, justification computer 3 generates read commands or signals which are applied along line 101 to record reader 1. Codes read by record reader 1 provide signals which are applied along line 160, through OR gate 9, and then along the input data buss made up of lines 167, 168, 169, 102, and 170. These codes on the input data buss are applied to 1.) buffer 2 which stores data codes read upon command from justification computer 3, 2.) code counter 12 (through AND gate 25) which counts the number of data codes read and stored after the occurrence of a carrier return or after the occurrence of a buffer full signal, and 3.) justification computer 3. Justification computer 3 accumulates justification information such as the escapement value of each character and space along with the number of characters and spaces on each line and computes the justification solutions. Further, the justification computer controls the memory address counter within buffer 2 where operations such as determining the addressing and location of each character are accomplished. The memory address counter advances sequentially with each read or write command applied along lines 152 or 153. Signals representing the buffer address are also fed back to justification computer 3 along line 26, and the address of the first data code of each current line is stored.

While operating in the normal justification mode, codes are read and stored in the buffer until enough codes have been input to form a justified line. At this time the justification computer generates a plurality of signals one is an end of input memory code (EOM input code) applied along line 27. This code is allowed to be written into buffer 2 by pulses applied along line 153. Thereafter, the record read signals applied along line 101 to the record reader are halted. Then the justification computer 3 outputs signals or pulses which are applied along line 154 to the memory address counter within buffer 2 to reset it to the address of the first character code of the current output line. This address follow the address of the last data code printed on the previous line. Subsequently, justification computer 3 outputs read signals to the buffer along line 152. The output of the buffer applied along lines 162 and 155 forms the input to printer control 4 along line 110, since the condition NOT scan is met at AND gate 11.

Another input to printer control 4 is the escapement value assigned to each space in accordance with the computed justification solution for the output line, and this is applied along line 104. At the end of each output line the justification computer outputs a carrier return signal which is applied along line 103 causing the carrier of the printer 5 to return to the left margin for the beginning of the next line. At this time there may be data codes in the buffer which were not printed. These will be on the next line. Upon a carrier return the scan latch 16 is set, and an indication thereof to the justification computer is applied along line 106. Justification computer 3 thereafter outputs read signals to buffer 2 along line 152 and the data codes following the last character printed appear sequentially on the output data buss made up of lines 162, 155, 158, 156, 157, and 100. In this instance, these codes are not transmitted to printer control 4 to be printed since the condition scan is applied to AND gate 11. is Instead the codes are applied along line 100 to AND gate 8 which, since its other input scan is true, passes them along line 150, through OR gate 9 to the input data buss. As these codes are sequentially applied to the input data buss, the justification computer tabulates the escapement values of the characters and spaces represented by the codes, and the code counter 12 increments once for each code. The justification computer does not apply write commands to the buffer since the codes are already stored therein. When the EOM input code previously written into the buffer following the last data code input appears on the output data buss, an indication thereof is provided by EOM decode 7. This signal causes scan latch 16 to reset, terminating the scan operation. At the termination of the scan operation the data codes input, but not printed on the previous line, have been tabulated in the justification computer and counted in the code counter 12 in the same manner as input data codes read by record reader 1. Thereafter the justification computer resumes applying record read signals along line 101 in order to complete the input for the new line.

The input to code counter 12 applied along line 170 is dependent on the coincidence of a NOT EOM signal and codes applied along line 102 through AND gate 25. Therefore, code counter 12 does not increment on the EOM input code. The NOT EOM signal is derived from inverter 30, inverting the EOM signal detected by decode 7. Also, buffer 2 is provided with similar well known gating means which prevent the counting of EOM input codes by the memory address counter. The result is that the code for the first character upon the resumption of codes being read by the record reader will be written in the position formerly occupied by the EOM input code. That is, this code is effectively removed from the buffer.

What has been described above involves the situation where there is adequate storage capacity in the buffer for computing a justification solution for an output line.

In those instances where more codes are required for an output line than the buffer can hold, provision must be made therefor. Those instances encompass the use of characters and spaces having small escapement values, and/or the use of very long measures. When this situation arises, as codes are read from the record reader and applied along the input data buss, they are simultaneously counted by code counter 12. Counter 12 is reset at the beginning of each line upon the occurrence of a carrier return signal applied through OR gate 17. Thus far the operation is still essentially the same as described above, where the codes are counted and the code counter is reset at the beginning of each line.

Each time the code counter 12 counts up to and including $n-1$ codes, where n is the number of codes capable of being stored in the buffer, buffer full latch 14 is set by the output of detector 13 applied along line 171. With buffer full latch 14 set, a signal is output to 1.) the justification computer 3 along line 105, and 2.) the code generator 19 along line 163. A signaling code being an end of input memory code (EOM input code) is generated by code generator 19. This is a special code which is applied to AND gate 10. The condition buffer full from buffer full latch 14 and the signal NOT scan satisfy the conditions for gating the EOM input code through AND gate 10, OR gate 9, and along lines 167 and 168 into buffer 2 upon a write pulse applied along line 152. Thus, this code is stored in the buffer after $n-1$ codes have been counted and stored.

Code generator 19 is shown separately to make the drawing more easily understood. As is obvious however, justification computer 3 will include a code generator (for applying EOM input codes along line 27 to buffer 2) which could be used for generating the same code that is generated by generator 19.

The output of buffer full latch 14 is applied along line 105 to the justification computer 3, causes the EOM input code to be stored in buffer 2, and causes justification computer 3 to cease outputting record read signals to record reader 1 along line 101. With the buffer now full, containing $n-1$ data codes plus the EOM input code, in order to provide for the additional codes necessary to justify the line, it is necessary to output some of the data contained in the buffer to make room for more data. With the above conditions being met, justification computer 3 first applies signals to the memory address counter within buffer 2 along line 154 to reset it to the address following the last data code printed. Then, justification computer 3 applies read signals to buffer 2 along line 152 causing buffer 2 to output data to the output data buss. In this instance, data codes output to the output data buss, and particularly along lines 162 and 155, are applied to AND gate 11. With the condition of NOT scan still being met, the data codes are applied along line 110 to printer control 4. The scan condition from scan latch 16 is not met since a space code has not been applied to AND gate 15. The output of printer control 4 is applied along line 159 to printer 5 which is caused to begin a printing operation. As characters corresponding to the codes are printed, more room is made within the buffer. Upon the occurrence of a space code on the output data buss, an indication thereof is detected, and an output is generated by space decode 6 which receives an input applied along lines 162, 158 and 157. The space printed upon the occurrence of a space code at this time has a predetermined escapement value, or a minimum interword space size is used, and calculations after this space will include the next character. Also, the minimum interword space size can be the same minimum interword spacing employed during justification.

The coincidence of a buffer full signal and a space signal (generated by decode 6 applied to AND gate 15 and along line 165 will set scan latch 16. The signal output from scan latch 16 applied along line 106 to justification computer 3 will cause justification computer 3 to continue applying read signals to buffer 2 along line 152. However, the data read from buffer 2 is not gated through AND gate 11 to the printer control in this instance. This is because of the presence of a scan signal due to the scan latch having been set. In this case, the output of buffer 2 is applied along line 100, through AND gate 8, along line 150 to OR gate 9, and then along the input data buss. The output of scan latch 16 applied along line 106 to justification computer 3 also causes justification computer 3 to recalculate a new justification solution. This solution is based on the codes gated through AND gate 8 and along the input data buss in a manner similar to the codes having been read from record reader 1 as discussed above. In this instance no write commands are applied along line 153 by the justification computer since the data codes are already stored in the buffer.

Code counter 12, which had previously counted $n-1$ input codes and which was previously reset along line 166 by a buffer full signal from buffer full latch 14 applied to OR gate 17, will now count up again, incrementing once for each code coincident with a NOT EOM signal at AND gate 25. When the EOM input code, which was stored in the buffer after the storage of $n-1$ data codes, is detected and an EOM signal is generated by EOM decode 7, buffer full latch 14 will be reset by a pulse applied along line 164. This is due to the coincidence of the EOM signal and the scan signal applied to AND gate 18 and gated through OR gate 20. Also, the EOM signal will cause scan latch 16 to reset. This results in justification computer 3 signaling record reader 1 along line 101 for output reading of more data codes. The operation now resumes as if an input line had been accumulated to this point without reaching the buffer capacity or printing data codes. Note however, that justification computer 3 tabulates the sum of escapement values of data codes representing characters and spaces printed during the time there is a buffer full signal. This occurs in order that these values may be considered when calculating the justification solution for the remainder of the line.

In the event the storage capacity of buffer 2 is again about to be exceeded and insufficient data codes have been read to compute justification solution, then as indicated above, the next word will be output by the printer resulting in another scan cycle (rereading and recounting of data codes remaining in the buffer) followed by a resumption of reading of input codes to attempt to form another justification solution. Each space which is detected coincident with a buffer full signal will result in a predetermined unit space output by the printer. This is controlled by an output from the justification computer applied along line 104 to printer control 4 when a buffer full signal is applied along lines 161 and 105. When sufficient codes have been stored in the buffer 2, without exceeding the capacity thereof, for computing a justification solution, the justification computer 3 will compute a solution based on the number of spaces remaining in the buffer 2 and the number of escapement units to the last character to be printed, and will effect a solution for the remainder of the line.

In the event sufficient codes have been read, stored, and counted to compute a justification solution, and this event is coincident with n-1 data codes having been read, stored, and counted, then an output from the justification computer 3 applied along line 21 is gated through OR gate 20, resetting buffer full latch 14 and preventing the controlled output scheme described above. A justified line is output by printer 5.

An alternative to the above would be for the justification computer to tabulate the escapement units of each character output during the buffer full condition in such a way that a rescan of data remaining in the buffer would not be necessary. Also, it is not mandatory to output a part of the line until a space code occurs. A simple counter could be used to effect outputting a fixed number of codes prior to scanning the remaining data.

In the above description it will be appreciated by those skilled in the art that AND gates 8, 10, 11, 25, and OR gates 9 and 20 are symbolic of a plurality of similar gates while the inverter 30 is symbolic of a single gate. Additionally, data lines 100, 102, 110, 150, 27, etc., are symbolic of a plurality of signal lines.

Detailed circuitry appropriate to the blocks in the system shown in the drawing is not presented since such details are sufficiently known to those practicing in this and allied arts, especially those relating to electronic computers and processors. For example, the various latches depicted may be flip-flops, while counter 12 can be a simple resettable binary counter. Decodes, such as 6 and 7, and detector 13 can be combinational logic as taught in standard texts. Code generator 19 and buffer 2 including the memory address counter are well known devices utilized in the electronic computer and processor arts.

While the invention has been particularly shown and described, with reference to a preferred embodiment, it will be understood by those skilled in the art that various changes in form and detail may be made without departing from the spirit and scope of the invention.

What is claimed is:

1. A system for controlling the printing of an output line from data codes output to a printer from a buffer which is capable of storing *n* data codes, said system comprising:

means for inputting data codes into said buffer;

means for counting said data codes input into said buffer;

means for generating a singnaling data code after said buffer contains $n-1$ data codes;

means upon the occurrence of said signaling data code for attempting the calculation of a justification solution based on the number of said data codes input into said buffer;

means for causing output of data codes from said buffer for printing a justified output when a justification solution is calculated;

means for causing output of a number of data codes from said buffer for printing a predetermined number of characters when a justification solution cannot be calculated based on the number of data codes stored in said buffer.

2. A system according to claim 1 further including means for inputting said signaling data code into said buffer.

3. A system according to claim 2 further including means for causing output of data codes remaining in said buffer after said predetermined number of characters have been printed.

4. A system according to claim 3 further including means for inputting said remaining data codes back into said buffer.

* * * * *